Sept. 27, 1966   D. C. JONES   3,274,713
HYDRAULICALLY CONTROLLED SCARIFIER
Filed April 16, 1964   2 Sheets-Sheet 1
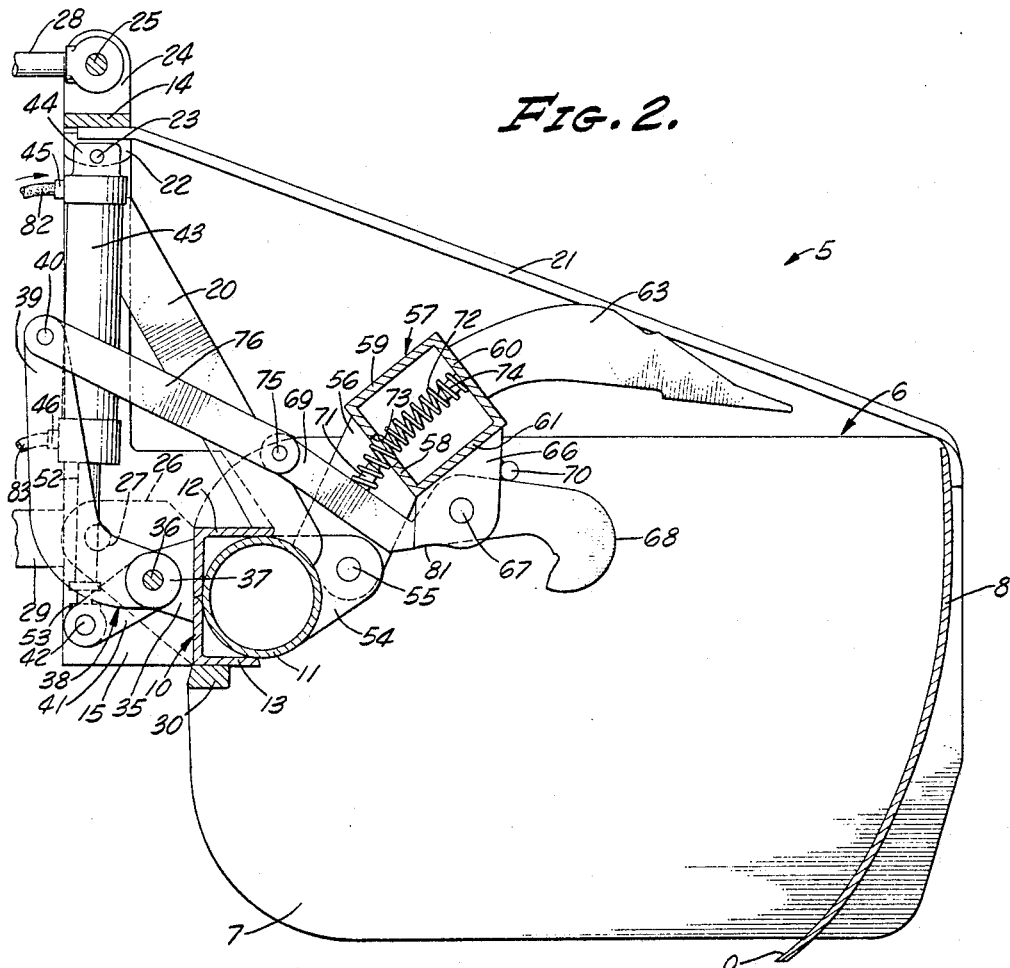
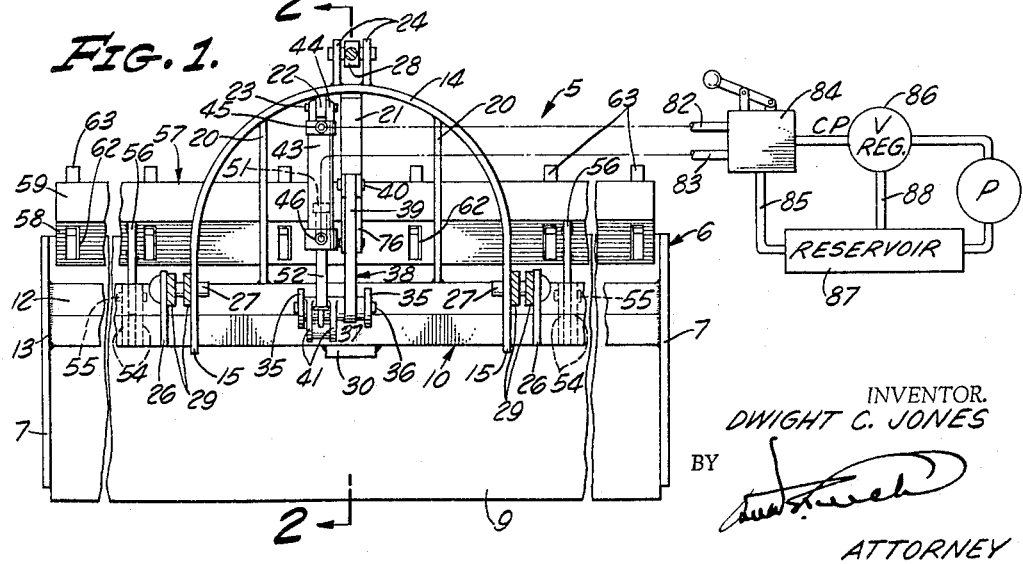
INVENTOR.
DWIGHT C. JONES
BY
ATTORNEY Sept. 27, 1966  D. C. JONES  3,274,713
HYDRAULICALLY CONTROLLED SCARIFIER
Filed April 16, 1964  2 Sheets-Sheet 2

INVENTOR.
DWIGHT C. JONES
BY
ATTORNEY

United States Patent Office 3,274,713
Patented Sept. 27, 1966

3,274,713
HYDRAULICALLY CONTROLLED SCARIFIER
Dwight C. Jones, La Habra, Calif., assignor to Earthcavator Company, Inc., a corporation of California
Filed Apr. 16, 1964, Ser. No. 360,248
5 Claims. (Cl. 37—145)

This invention relates to powered earth working tools and particularly to a scarifier which is shiftable between an upwardly retracted inoperative position and a downwardly extended operative position.

The invention is especially designed to be employed in association with an earth scraper provided to be hitched to a powered tractor and power maneuvered by the driver of the latter in earth scarifying, scraping, spreading and leveling operations.

A combination earth scraper and scarifier of the general type mentioned is disclosed in U.S. Patent No. 2,865,117 issued December 23, 1958, to M. C. Davis, Butler Perryman, and R. C. Gannon on Earth Scraper with Retractable Scarifier. The mechanism in the patented device for shifting the scarifier between retracted and operative positions is powered entirely by the muscular effort applied thereto by the driver. In a copending application Serial No. 360,234, filed herewith, I have disclosed an improved scarifier and mechanism for shifting the same, which, nevertheless, relies on the strength of the driver entirely for its motive force.

Inasmuch as modern tractors provided for handling such scrapers generally have hydraulic power take-offs, it is an object of the present invention to devise such a shiftable scarifier, the power for shifting which is hydraulically supplied by the tractor motor, thus relieving the driver of this burden and reducing the fatigue of operating a combined scraper and scarifier.

Another object is to provide such an improved scarifier which is simple and thus relatively inexpensive to manufacture, so that it can be supplied for only a minor price differential over a manually actuated scarifier.

A further object is to provide such a hydraulically powered scarifier which is quickly retracted or extended by the simple manipulation of a valve to initiate either one of these movements, the scarifier being held in the position to which it is moved by the continuous application of hydraulic pressure thereagainst.

Still another object of the invention is to provide such a scarifier which is automatically locked in its extended position after it has been moved into said position, and is positively held locked in said position until the driver throws the valve for moving the scarifier to its retracted position, and is then automatically unlocked prior to the movement of said scarifier to its retracted position being started.

Scarifiers heretofore provided for use on scrapers and which drew upon the muscular power of the driver of the tractor for shifting the scarifier between a relatively low extended position and a relatively high retracted position required the provision of some kind of weight counterbalancing means, usually consisting of heavy coiled springs. These springs have to be adjusted in order to function satisfactorily when changing the number of teeth on the scarifier and also constitute a maintenance problem due to their tendency to break without warning.

A yet further object of the invention, therefore, is to provide an improved scarifier which does not require such a counterbalance means.

The manner of accomplishing the foregoing objects as well as further objects and advantages will be made manifest in the following description taken in connection with the accompanying drawings in which FIG. 1 is a diagrammatic front elevational view of a preferred embodiment of the invention which is incorprorated in an earth scraper, this view showing the scarifier in its upwardly retracted position.

FIG. 2 is an enlarged vertical cross sectional view taken in the vertical fore-and-aft plane indicated by the line 2—2 in FIG. 1.

Figure 3:
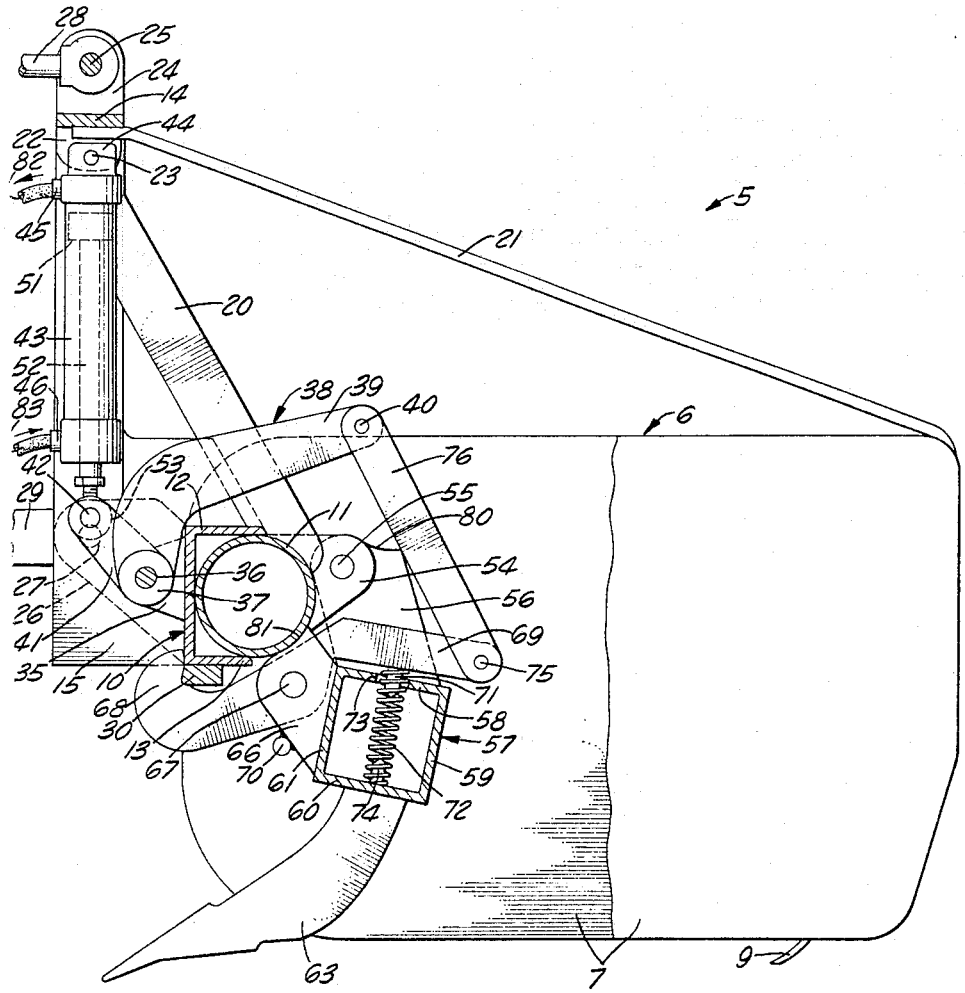
FIG. 3 is a view similar to FIG. 2 and illustrates the scarifier bar of the invention in its downwardly extended position.

Referring specifically to the drawings, the invention is there disclosed as embodied in a combination earth scraper and scarifier 5 which embraces a rectangular scraper bucket 6 having side walls 7 the rear end portions of which are connected together by a back wall 8, the lower edge portion of which wall forms a forwardly inclined scraper blade 9. Connecting forward portions of the side walls 7 is a draft beam 10 which includes a heavy cylindrical pipe 11 which is reinforced by an upper angle iron 12 and a lower angle iron 13 which are welded to the forward face of said pipe. An arched, inverted U-shaped draft yoke 14 having feet 15 is symmetrically united to said beam by welding said feet to said beam. The plane of symmetry of yoke 14 is the fore-and-aft-vertical axial plane 2—2 which bisects the scraper bucket 6 and beam 10.

Disposed in parallel equidistant relation with plane 2—2 are a pair of brace bars 20 upper ends of which extend within and are welded to yoke 14 and lower ends of which are shaped to fit and are welded to the upper back portion of beam 10. The yoke 14 is braced to the bucket 6 by a brace bar 21 which is welded at its upper end to the yoke and at its rear end to back wall 8. Welded to the yoke 14 and extending downwardly therefrom just to one side of plane 2—2 is a cylinder mounting lug 22 which is apertured for reception of a pin 23. Welded to and extending upwardly from the top-most portion of yoke 14 is a pair of hitch attaching lugs 24 which are apertured to receive a pin 25. Welded to the front face of beam 10 just outwardly from yoke feet 15 are hitch bar attaching lugs 26, said lugs and feet being provided with aligned apertures for receiving heavy pins 27.

The combination tool 5 is hitched to a powered tractor by means of an extensible upper hitch element 28 which is pivotally connected to lugs 24 by pin 25 and hitch bars 29 which are pivotally connected by pins 27 to feet 15 and lugs 26.

Welded to the lower face of lower angle iron 13 of beam 10 at its forward corner is a centrally located striker plate 30. Welded to the front face of beam 10 in slightly off-centered relation with respect to plane 2—2, is a pair of bearing lugs 35 having horizontally coaxial holes for mounting a shaft 36 on which the hub 37 of a bell crank 38 is pivotally mounted. Welded on hub 37 so as to lie within plane 2—2 is a relatively long rearwardly angled arm 39 which is apertured to receive a pin 40 in its upper end. Also welded to hub 37 and extending downwardly and forwardly from said hub, at an angle of approximately 90° with arm 39, is a pair of relatively short arms 41 which have aligned apertures for mounting a pin 42 therein.

Mounting approximately vertically within the yoke 14 is a hydraulic cylinder 43 having a bifurcated head 44 which is split to receive lug 22 and apertured to receive pin 23 so as to pivotally mount said cylinder on said lug. The cylinder 43 has hose connections 45 and 46 which connect with upper and lower ends of said cylinder for actuating the same from a hydraulic power take-off provided on a tractor to which the device 5 may be hitched. Slidable within the cylinder 43 is a piston 51 to which is connected a piston rod 52 which extends through a suitable packing in the lower end of the cylinder to terminate in a longitudinally adjustable transversely apertured head 53 which is disposed between short arms 41 and pivotally connected to these by pin 42.

Welded to the pipe 11 of beam 10 and spaced equal distances from plane 2—2 are two vertical pairs of rearwardly extending scarifier bar mounting lugs 54, said lugs being coaxially apertured to receive two pins 55. Extending neatly between the lugs 54 of said pairs and pivotally mounted on pins 55 are bar lugs 56 the outer ends of which are welded to a scarifier bar 57 which is preferably made up of two angle irons welded together to give bar 57 a hollow square cross section having flat walls 58, 59, 60 and 61. The walls 58 and 60 have a series of apertures 62 through which scarifier teeth 63 are admitted, there being means (not shown) for securely locking said teeth in united relation with said bar.

Welded to wall 61 of bar 57, equidistant from plane 2—2 and spaced apart slightly over one inch, is a pair of hook mounting lugs 66. These lugs have coaxial apertures to receive a horizontal pin 67. Extending between lugs 66 and pivotally mounted on pin 67 is a massive hook 68 which is preferably made of inch thick steel plate and which has welded thereto an arm 69 which is preferably made of half inch plate and extends approximately in an opposite direction from pin 67 to that in which hook 68 extends therefrom. Welded at its ends to lugs 66 is a hook stop rod 70 which limits the counterclockwise swinging of the hook 68 about pin 67 at its extreme non-locking position.

Arm 69 has a pin 71 extending inwardly therefrom on which is received one end of an expansive coiled spring 72 which spring extends through a hole 73 provided in bar wall 58 and the opposite end of said spring receives a pin which extends inwardly from wall 60 in alignment with hole 73. The spring 72 thus provides a means for yieldably maintaining the hook 68 swung against stop rod 70 as shown in FIG. 2 whenever said spring is not overcome by a superior force. The free end of arm 69 is pivotally connected by a pin 75 to a pair of thin plates forming a link 76 the opposite ends of which plates overlie opposite faces of angled arm 39 and are pivotally connected by pin 40 to the upper end of said arm.

It is to be noted that bar lugs 56 have arcuate stop faces 80 (FIG. 3) and hook mounting lugs 66 have arcuate stop faces 81 (FIG. 2), the purpose of which is to provide positive limit stops for halting the scarifier bar 57 respectively in its upward retracted position as shown in FIG. 2 and in its downward extended position as shown in FIG. 3.

Operation

When the device 5 has been properly hitched to a power tractor for maneuvering said device in the performance of all of its many functions, the hose connections 45 and 46 at the upper and lower ends of cylinder 43 are connected to flexible hoses 82 and 83 which lead to a suitable manual control valve 84 which is connected by a pipe 85 to a pressure regulating valve 86 which delivers liquid to valve 84 at a suitable pressure for operating cylinder 43 but allows liquid supplied by the pump P of said tractor to valve 86 to by-pass to reservoir 87 whenever said pressure of liquid in pipe 85 rises above a certain maximum. The valve 84 has only two positions, in one of which it delivers liquid under pressure to the hose 82 (while connecting the hose 83 to pipe 88 which returns the same to reservoir 87); and in the other of which valve 84 delivers pressure liquid to hose 83 and connects hose 82 to said reservoir.

Thus when valve 84 is positioned to deliver liquid under pressure to the upper end of cylinder 43, the piston 51 of this cylinder is held downwards thus pulling upward on link 76 so as to snugly rotate scarifier bar 57 into its uppermost position shown in FIG. 2 in which the stop faces 80 on lugs 56 firmly engage the draft beam pipe 11. This is, therefore, the position in which valve 84 is maintained while performing all the operations desired with the tool 5 other than a scarifying operation. In other words the scarifier bar is held up constantly by the maintaining of liquid under pressure in the upper end of cylinder 43.

Whenever the driver desires to use the scarifier of the invention for a scarifying operation, all he has to do is to flip the valve 84 to its other position which connects the upper end of cylinder 43 with reservoir 87 and directs liquid under pressure into the lower end of cylinder 43. This immediately relaxes the scarifier sustaining action of the power means of the device and allows the scarifier to swing downwardly by gravity from its upward position until the stop faces 81 on lugs 66 come into engagement with the draft beam pipe 11, but with the hook 68, up to this point, retained by spring 72 in its maximum non-locking position against stop rod 70. At the moment the stop faces 81 on lugs 66 engage pipe 11, however, the power of the hydraulic power means of the invention is applied through link 75 to the arm 69 of the hook 68 so as to compress spring 72 and snap hook 68 upwardly into locking relation with the striker plate 30 and the forward lower edge of the draft beam 10. It is believed clear that so long as the liquid under pressure remains connected with the upper end of cylinder 43, this liquid holds the hook 68 thus locked with the striker plate 30 and draft beam 10. Assurance is thus provided against hook 68 being relaxed throughout the scarifying action which is engaged in following the lowering of the scarifier into operative position.

Whenever the driver of the tractor is through with using the scarifier, all he has to do is merely flip the valve 84 to its other position. The immediate effect of this is to pull upwardly on link 75 so as to cooperate with spring 72 in snapping the hook 68 downwardly out of locking relation with the striker plate 30 and, immediately following this action, apply the power of the hydraulic power means through the link 75 and the hook arm 69 to the scarifier to swing the latter into its upwardly retracted position as shown in FIG. 2.

While only a single embodiment of the present invention has been disclosed herein, it is to be understood that various changes and modifications may be made in this specific embodiment, without departing from the spirit of the invention or the scope of the appended claims.

What is claimed is:

1. A scarifier embodied in an earth scraping tool drawn by a powered tractor, said scarifier comprising: a draft beam adapted to be supported rigidly at its opposite ends on said tool; a scarifier bar having teeth attached thereto, said bar being arranged parallel with and generally rearwardly from said beam; pivotally connected lugs fixed on said beam and said bar at symmetrically spaced points thereon for pivotally mounting said bar on said beam on a transverse axis disposed between said bar and said beam whereby said bar is swingable about said axis between a downward teeth extending position and an upward teeth retracting position; striker plate means provided upon a forward lower edge of said beam; hook means disposed symmetrically with the central vertical fore-and-aft axial plane of said beam and pivotally mounted on said bar on a transverse axis, said hook means being adapted to hook upwardly over said striker plate means after said bar has been swung into its downward position; a stop mounted on said bar; means for yieldably holding said hook means in non-locking position and in an engagement with said stop; and reversible hydraulically operable power means mounted on said beam and being connected by a rigid link to said hook means, said power means, when positively power actuated, holding sad bar, through said hook means, in upward position, said power means, when reversely power actuated, releasing said bar, permitting it to swing by gravity to its downward position the link connecting said power means and said hook means being effective, after said bar has reached said downward position, to positively overcome said yieldable means and swing said hook means upwardly into locking relation with said striker plate means, said power means holding said hook means in said locking relation until said power means is again positively actuated, whereupon, said power means relaxes its pressure holding said hook means in locking position, positively swings said hook means to non-locking position against said stop then returns said bar to its upward position and continues to hold said bar in said position.

2. A scarifier as recited in claim 1 wherein said hook means comprises a single massive hook located symmetrically with and moving in said vertical axial plane, said hook having an arm extending in approximately the opposite direction than said hook from the pivotal axis of the latter, the connection of said hydraulic power means with said hook means being with a pivotal connection a free end portion of said arm, and wherein said yieldable means for urging said hook into open position is mounted within said bar and engages said arm.

3. A scarifier as recited in claim 1 wherein said bar is provided with stop means which respectively engage said beam to limit the upward swinging of said bar when the latter reaches its upward retracted position and the downward swinging of said bar when it reaches its downward extended position, and wherein said hook means comprises a single massive hook located symmetrically with and moving in said vertical axial plane, said hook having an arm extending in approximately the opposite direction than said hook from the pivotal axis of the latter and in a generally upward direction between said beam and said bar, and wherein said power means comprises a hydraulic cylinder having a piston and piston rod which are reversely shiftable in said cylinder by the optional admission of liquid under high presure to one end or the other of said cylinder, and a mechanism including a bell crank pivotally mounted on a transverse axis on said beam and having a relatively short arm pivotally connected to said piston rod and a relatively long arm extending upwardly and a link pivotally connected at its upper end to the latter arm and at its lower end to the free end of said hook arm, whereby delivery of liquid under high pressure to one end of said cylinder continually holds said scarifier bar in its upward retracted position, while relaxing the pressure on said one end of said cylinder and delivering liquid under pressure to the opposite end thereof causes said link to push downwardly on said hook arm and, through the pivotal connection of said hook with said bar, on said bar, thereby swinging the latter downwardly until it is halted by said stop means in its downward position, with said hook still in non-locking position, and then acts on said hook arm to rock said hook into locking relation with said striker plate means, said hook being continually held in said position by said liquid under pressure until the delivery of the latter into said hydraulic cylinder is again reversed, whereupon said link immediately pulls upwardly on said hook arm, withdrawing said hook from locking relation with said striker plate means and freeing said scarifier bar whereby the latter is immediately swung upwardly by the pulling of said link on said hook arm until said scarifier arrives at its upward position and brings said stop means into engagement with said draft beam, the liquid under pressure in said cylinder then continuing to hold said bar in said upward position.

4. A scarifier as recited in claim 3 wherein said scarifier bar is of hollow tubular construction and said yieldable means for urging said hook into non-locking position is mounted within said bar and extends through an opening therein into engagement with said hook arm in order to accomplish its function aforesaid.

5. A scarifier as recited in claim 3 wherein said beam is provided with an inverted U-shaped draft yoke the lower ends of which are welded to said beam, said yoke being symmetrically related to said fore-and-aft vertical axial plane of said beam, and means for mounting said hydraulic cylinder within said yoke and pivotally connected at its upper end to said yoke.

References Cited by the Examiner

UNITED STATES PATENTS

| | | | |
|---|---|---|---|
| 1,285,900 | 11/1918 | Bartholomew | 172—269 |
| 1,854,904 | 4/1932 | Johnson | 172—269 X |
| 2,555,555 | 6/1951 | Olson et al. | 172—269 |
| 2,839,851 | 6/1958 | Geiszler | 37—145 |
| 2,865,117 | 12/1958 | Davis et al. | 37—145 |

FOREIGN PATENTS

| | | |
|---|---|---|
| 899,731 | 12/1953 | Germany. |
| 352,851 | 7/1931 | Great Britain. |
| 639,151 | 6/1950 | Great Britain. |

ABRAHAM G. STONE, *Primary Examiner.*

JOE O. BOLT, WILLIAM A. SMITH III, *Examiners.*

UNITED STATES PATENT OFFICE
CERTIFICATE OF CORRECTION

Patent No. 3,274,713                                              September 27, 1966

Dwight C. Jones

It is hereby certified that error appears in the above numbered patent requiring correction and that the said Letters Patent should read as corrected below.

Column 4, line 67, for "sad" read -- said --; column 5, line 14, for "with a pivotal connection" read -- a pivotal connection with --.

Signed and sealed this 29th day of August 1967.

(SEAL)
Attest:

ERNEST W. SWIDER
Attesting Officer

EDWARD J. BRENNER
Commissioner of Patents